(12) United States Patent
Lauwereins et al.

(10) Patent No.: US 12,062,892 B2
(45) Date of Patent: Aug. 13, 2024

(54) RECONFIGURABLE OVERHEAD UNIT, SYSTEM AND METHOD

(71) Applicant: Televic Rail NV, Izegem (BE)

(72) Inventors: Steven Lauwereins, Oudenaarde (BE); Dirk Van Den Wouwer, Melsele (BE); Geert Van Doorselaer, Assebroek (BE)

(73) Assignee: Televic Rail NV, Izegem (BE)

( * ) Notice: Subject to any disclaimer, the term of this patent is extended or adjusted under 35 U.S.C. 154(b) by 267 days.

(21) Appl. No.: 17/753,674

(22) PCT Filed: Sep. 14, 2020

(86) PCT No.: PCT/EP2020/075645
§ 371 (c)(1),
(2) Date: Mar. 10, 2022

(87) PCT Pub. No.: WO2021/048437
PCT Pub. Date: Mar. 18, 2021

(65) Prior Publication Data
US 2022/0324398 A1 Oct. 13, 2022

(30) Foreign Application Priority Data

Sep. 13, 2019 (EP) ..................................... 19197422

(51) Int. Cl.
*H02G 15/007* (2006.01)
*B61L 15/00* (2006.01)
(Continued)

(52) U.S. Cl.
CPC ........ *H02G 15/007* (2013.01); *B61L 15/0018* (2013.01); *B61L 15/009* (2013.01);
(Continued)

(58) Field of Classification Search
CPC ........ H02G 15/007; H02G 3/32; H02G 15/00; H02G 15/06; H02G 15/064;
(Continued)

(56) References Cited

U.S. PATENT DOCUMENTS 4,367,417 A * 1/1983 Casasanta ................. F21S 2/00
362/225
4,540,847 A * 9/1985 Gardner ................... E04B 9/127
174/491

(Continued)

FOREIGN PATENT DOCUMENTS

DE     19646903 A1   12/1997
EP     3184398 A1   6/2017
(Continued)

OTHER PUBLICATIONS

Extended European Search Report from EP Application No. 19197422.9 (filed Sep. 13, 2019), mailed Apr. 7, 2020.

(Continued)

*Primary Examiner* — Angel R Estrada (57) ABSTRACT

The present invention pertains an overhead unit (1) for presenting information, gathering information, transferring information, lighting and/or alarm signals in an individualized manner in a carriage or fuselage, comprising a function module (2), a fixation module (3) for removably attaching the overhead unit to a rail, two receival modules (5a, 5b) for receiving signals, two transmission modules (4a, 4b) for sending messages and a processing module (6) for processing messages, whereby the receival modules and the transmission modules are operationally connected to the processing module, wherein the fixation module comprises a mechanical fixation system (7) configured to interlock with a fixation system of the rail, wherein the overhead unit comprises a proximal longitudinal end (9) and a distal longitudinal end (10), wherein the receival modules com-
(Continued)

prise a proximal receival module located at the proximal end of the overhead unit and a distal receival module located at the distal end of the overhead unit, whereby the receival modules each comprise a sensor, wherein the transmission modules comprise a proximal transmission module located at the proximal end of the overhead unit and a distal transmission module located at the distal end of the overhead unit, whereby the transmission modules each comprise a transmission source, wherein the processing module of the overhead unit is configured to receive signals via the receival modules from a neighbouring overhead unit or from a neighbouring control unit, and/or wherein the processing module of the overhead unit is configured to cause the transmission modules to send out signals to a neighbouring overhead unit and/or the control unit.

18 Claims, 5 Drawing Sheets

(51) Int. Cl.
  *B64D 11/00* (2006.01)
  *G08B 5/22* (2006.01)
  *H01R 25/14* (2006.01)
  *B61D 41/00* (2006.01)
  *H02G 3/32* (2006.01)

(52) U.S. Cl.
  CPC .......... *B64D 11/0015* (2013.01); *G08B 5/22* (2013.01); *H01R 25/14* (2013.01); *B61D 41/00* (2013.01); *B64D 2011/0053* (2013.01); *H02G 3/32* (2013.01)

(58) Field of Classification Search
  CPC .... B61L 15/0018; B61L 15/009; B61L 15/00; B64D 11/0015; B64D 41/00; B64D 2011/0053; B64D 11/00; H01R 25/14; H01R 25/00; G08B 5/22
  USPC ......... 174/491, 480, 481, 40 R, 40 CC, 503; 220/3.2–3.9, 4.02; 361/600, 601, 602, 361/679.01
  See application file for complete search history.

(56) References Cited

U.S. PATENT DOCUMENTS

| | | | | |
|---|---|---|---|---|
| 7,219,942 | B2* | 5/2007 | Schedivy | B60R 11/00 |
| | | | | 296/214 |
| 7,661,229 | B2* | 2/2010 | Frecska | E04B 9/244 |
| | | | | 174/491 |
| 8,267,557 | B2* | 9/2012 | Vogel | B60Q 3/47 |
| | | | | 362/477 |
| 9,499,270 | B2 | 11/2016 | Riedel et al. | |
| 11,305,689 | B2* | 4/2022 | Jha | B64D 11/00 |
| 11,392,815 | B1* | 7/2022 | Huijsing | G06K 19/0723 |
| 2005/0082862 | A1 | 4/2005 | Anderson et al. | |
| 2007/0061847 | A1 | 3/2007 | Callahan et al. | |
| 2008/0186721 | A1 | 8/2008 | Vogel et al. | |

FOREIGN PATENT DOCUMENTS

| | | |
|---|---|---|
| EP | 3529106 B1 | 12/2020 |
| WO | 2018073606 A1 | 4/2018 |

OTHER PUBLICATIONS

International Search Report and Written Opinion from PCT Application No. PCT/EP2020/075645 (filed Sep. 14, 2020), mailed Nov. 9, 2020.

* cited by examiner

RECONFIGURABLE OVERHEAD UNIT, SYSTEM AND METHOD

TECHNICAL FIELD

The present invention relates to an overhead system comprising a set of overhead units and a configuring method for such overhead units and system in a vehicle carriage or fuselage. More in particular, the present invention is particularly useful in carriages or fuselages, such as train carriages or airplane fuselages, wherein the positions and/or orientation of seats can vary. The overhead information units can be configured to perform a number of functions, including presenting information, gathering information, transferring information, lighting, alarm signals, etc. or a combination of these functions.

BACKGROUND

Trains for the transport of people typically consist of a number of carriages each having a number of passenger seats placed in an optimal or semi-optimal way with respect to capacity, comfort, safety, etc. These carriages may be provided with a set of devices installed overhead, such as seat displays, seat occupancy sensors, camera's (CCTV), internet access points (LiFi, Wifi, . . . ), smart lighting, speakers, . . . . These devices may be provided for each seat individually, for a pair of seats, for a set of seats which are treated as an easily identifiable group, or a combination thereof.

Individual or grouped seat displays on carriages can be used to display information, for instance:
  reservation of a (set of) seat(s), which may include a reservation number or reservation ID;
  occupancy status of a (set of) seat(s);
  warnings or other indications, e.g. to a seat occupant to notify that destination will be reached soon.

Other information can also be displayed, such as general travel information.

In some cases the arrangement of the passenger seat may require adaptation. Such adaptation may occur frequently. For instance, a train may comprise passenger seats being oriented mainly in the direction of travel. If such a train reaches its end destination, it may sometimes be easier to rotate the passenger seats over 180° in order to face in the other direction, rather than to turn the train or carriage. Another example may consist of a rearrangement of seats in carriages if they are used for different purposes, e.g. a carriage used for commuting over small distances will need to have its seats rearranged if it is to be used for long-distance travel. Hereby, the requirements for safety, comfort and capacity may change drastically, e.g. comfort may become more important than capacity or extra luggage space needs to be provided. For commuting purposes, typically a highly dense and individual type of seat arrangement is preferred (e.g. a metro-type seat arrangement), whereas for leisure travel purposes, a more social seat arrangement, e.g. with seating islands, could be preferred. Yet another example is a carriage which needs to be altered for night-travel, e.g. by providing more leg-space. A carriage may be provided with a first-class compartment having a different seat arrangement than a second-class compartment.

In the above cases, the seat arrangement changes. If the carriage is also provided with overhead units such as seat displays, one can see the problem that these units may need to be repositioned appropriately with the new seat arrangement. Similarly, if a carriage is to be provided with a seat display system, it may pose problems if the seat display system and the seat display configuration method is not flexible enough to allow implementation for a specific arrangement of seats in the carriage.

International patent application published under no. WO2017109020 (A1) discloses a display apparatus comprising attachment means for attaching said display apparatus to a window of a passenger vehicle, with a wireless communication interface for receiving information to be displayed, and display means for displaying at least part of said received information. Although such seat display apparatus allows to receive and display information, the displays need to be positioned near the windows and may not easily be repositioned.

The arrangement of a display device for electronic seat reservation indication of a reservation state of at least one passenger seat of a passenger seat unit in a vehicle, in particular a rail vehicle, wherein in an interior of the vehicle, a passage and several of the passenger seating units are provided, has been disclosed in patent European patent EP 2 821 310 B1. Hereby, the passenger seats are aligned parallel to the longitudinal direction of the aisle, wherein the display device is attached to a side wall of a passenger seat arranged on the passage facing the passage of a passenger seat unit. Such an arrangement of a display device for electronic seat reservation display is also known from JP 2005 014825 A.

Display devices for electronic seat reservation display in rail vehicles for passenger transport are known. These display devices are arranged, for example, in large-capacity cars of rail vehicles on an interior panelling element in the interior of the vehicle above a corresponding passenger seat unit to which the seat reservation display relates. In such a seat reservation display is generally displayed, from which starting station to which destination station the at least one assigned seat is reserved. The document DE 297 16 850 U1 describes such a display device for electronic seat reservation display in an interior of a railway passenger car. This display device is intended to replace the reservation frames attached to an interior panelling element above a corresponding passenger seat unit for inserting reservation slips. Meanwhile, the display device is at least partially integrated into the corresponding interior panelling elements and are no longer externally mounted on these elements. Although the arrangement of the display devices on/in these interior panelling elements ensures a relatively good visibility for passengers in the corridor of the vehicle, but makes it difficult to assign the individual display device to the associated passenger seat unit in a modified position of the passenger seating units.

Document DE-A-20 2006 016381 discloses an electronic seat reservation display device using LCD displays. Also the GB-A-2 352 553 and the EP-A-1 547 921 have display devices for electronic seat reservation display in vehicles to the object.

Upon entering a railway vehicle are passengers typically faced with the task of finding a free car seat you can take. For this purpose it is previously known to provide associated display devices for example, above the vehicle seats to a respective vehicle seat, which can be removed, whether the vehicle seat is free or reserved.

Document EP 2 821 310 A1 discloses an arrangement of a display device for electronically displaying the reservation state of at least one passenger seat of a passenger seat unit in a vehicle, in particular a rail vehicle, wherein in an interior of the vehicle, an aisle and several of these passenger seat units are provided, the passenger seats are aligned parallel to the longitudinal direction of the aisle. The display device is provided on a side facing the aisle of the passenger seat of a passenger seat unit. The invention further relates to a corresponding passenger seat unit with display device and a corresponding vehicle.

The above system allows the displays to move along with the seats, but does pose further problems. For instance, the seats must be provided with a display, which may be very costly. Furthermore, a rearrangement of the seats is not automatically detectable by a central control system, making it difficult to reconfigure the seats and display to present the correct information. If the seats are turned, the display could be facing the wrong side, etc.

US 2008/186721 A1 discloses a light module, a light-module carrier and an illumination system for an aircraft, which allow intelligent illumination and at the same time easy reconfiguration of cabin illumination. The light module provides information relating to its characteristics, while a control system determines a position of the light module on a light-module carrier, and on the basis of the determined position and of the characteristics of the light module adjusts the light module by way of a bus system of the light-module carrier according to a desired illumination. Although the light carriers herein can be attached in a daisy chain, this does not apply to the light modules. Furthermore, it seems that the light module cannot be attached to the light carrier at any possible position.

US 2007/061847 A1 discloses a cabin services system for an aircraft. The cabin services system comprises at least one wireless network, the at least one wireless network providing at least one cabin service. The cabin services system further includes a cabin attendant panel for communicating with the at least one wireless networks and configured to control the at least one cabin service. For such system, it seems difficult or costly to perform automatic location determination, which would be required for location-dependent lighting or any other location-dependent service.

The present invention intends to overcome the above mentioned problems. Thereto, the present invention concerns an overhead system comprising a set of overhead units which can be easily positioned and repositioned for a plethora of seat arrangements. The present invention further concerns a configuration method allowing automatic configuration and reconfiguration of the overhead system and its overhead units.

SUMMARY OF THE INVENTION

The invention concerns:
an overhead unit;
a rail for fixation of a set of overhead units along a linear trajectory;
a control unit for configuring, reconfiguring and communicating with at least one overhead unit;
a kit comprising a set of overhead units, a rail and a control unit as above;
a system comprising a set of overhead units, a rail and a control unit as above, which can be easily configured with respect to a seating arrangement in a carriage;
a carriage provided with such a system, and
a method of configuring and/or reconfiguring such a system with respect to a seating arrangement in a carriage.

The overhead unit, the rail, the control unit, the kit, the system, the carriage and the method are described in the claims and in the description further below.

The present invention can preferably be used in a vehicle carriage or fuselage. However, other applications can also be envisioned. For instance, the present invention can also be applied in distribution facilities or storage facilities, e.g. by attaching a set of overhead units on the rim of a shelf or in a vertical linear setup on storage racks to provide indications of the contents.

OVERVIEW OF THE FIGURES

DETAILED DESCRIPTION OF THE INVENTION

The present invention concerns an overhead unit (1) for presenting information, gathering information, transferring information, lighting and/or alarm signals in an individualized manner in a carriage or fuselage, comprising a function module (2), a fixation module (3) for removably attaching the overhead unit to a rail, two receival modules (5a, 5b) for receiving signals, two transmission modules (4a, 4b) for sending messages and a processing module (6) for processing messages, whereby the receival modules and the transmission modules are operationally connected to the processing module, wherein the fixation module comprises a mechanical fixation system (7) configured to interlock with a fixation system of the rail, wherein the overhead unit comprises a proximal longitudinal end (9) and a distal longitudinal end (10) which define a longitudinal direction (L) which is configured to essentially coincide with the longitudinal direction of the rail when the overhead unit is attached to the rail, wherein the receival modules comprise a proximal receival module located at the proximal end of the overhead unit and a distal receival module located at the distal end of the overhead unit, whereby the receival modules each comprise a sensor, wherein the transmission modules comprise a proximal transmission module located at the proximal end of the overhead unit and a distal transmission module located at the distal end of the overhead unit, whereby the transmission modules each comprise a transmission source, wherein the processing module of the overhead unit is configured to receive signals via the receival modules from a neighbouring overhead unit or from a neighbouring control unit, and/or wherein the processing module of the overhead unit is configured to cause the transmission modules to send out signals to a neighbouring overhead unit and/or the control unit.

Preferably, the processing module of the overhead unit is configured to receive signals via the receival modules from a neighbouring overhead unit or from a neighbouring control unit, and to cause the transmission modules to send out signals to a neighbouring overhead unit and/or the control unit. However, in the case the overhead unit is the first or last in a chain, the processing module of the overhead unit can be configured to receive signals via the receival modules from a neighbouring overhead unit or from a neighbouring control unit, or to cause the transmission modules to send out signals to a neighbouring overhead unit and/or the control unit. Indeed, the overhead unit may be used for receiving signals only (e.g. at the end of a chain), or for transmitting signals only (e.g. because it is the first in a chain and may not receive instructions but could be programmed to act as a master).

The overhead unit (1) of the present invention comprises a function module (2) preferably comprising a set of function components (2a, 2b, 2c, 2d, 2e), which preferably comprise any combination of the following:

a displaying module, preferably comprising a set of at least one display screen for presenting information to a passenger an intercom module;

a data-gathering module for obtaining data at or near the location of the overhead unit. The data-gathering module may comprise a seat occupancy sensor, a camera (e.g. a CCTV camera), microphone/auditory sensors, VOC sensor, a smoke detector sensor or any other type of security sensor, an alarm button;

a lighting module, which may comprise user-operated lighting and/or emergency lighting, an information transfer module, which may comprise a WiFi access point module and/or a WiFi signal enhancement module, a LiFi access point module and/or a LiFi signal enhancement module, a Bluetooth module, an ethernet interface with ethernet plug, and/or a USB interface with a USB port;

a power provision module which may comprise an electrical plug and/or a USB port.

The overhead unit further comprises a fixation module (3) for removable attaching the overhead unit to a rail, two receival modules (5a, 5b) for receiving messages, two transmission modules (4a, 4b) for sending messages and a processing module (6) for processing messages, whereby the receival modules and the transmission modules are operationally connected to the processing module. The fixation module comprises a mechanical fixation system (7) and preferably also a set of electrical power provision means such as electrical power contacts (8a, 8b). The mechanical fixation system is configured to interlock with a fixation system of the rail according to the present invention. The electrical power provision means are configured to receive electrical power from the rail when the fixation module of the overhead unit is interlocked with the fixation system of the rail. Preferably the electrical power provision means comprise electrical contacts which are configured to make contact with electrical power leads of the rail of the present invention when the fixation module of the overhead unit is interlocked with the fixation system of the rail. Alternatively, or additionally, the overhead unit may comprise a battery for providing power to electrical components of the overhead unit. The overhead unit comprises a proximal longitudinal end (9) and a distal longitudinal end (10) which define a longitudinal direction (L). The longitudinal direction (L) is configured to essentially coincide with the longitudinal direction of the rail according to the present invention when the overhead unit is attached to the rail. The receival modules comprise a proximal receival module located at the proximal end of the overhead unit and a distal receival module located at the distal end of the overhead unit. Likewise, the transmission modules comprise a proximal transmission module located at the proximal end of the overhead unit and a distal transmission module located at the distal end of the displaying unit. The receival modules each comprise a sensor for receiving signals. The transmission modules each comprise a transmission source for transmitting signals. Hereby, the transmission module comprises a source which is compatible with the sensor of the receival module.

Figure 1A:
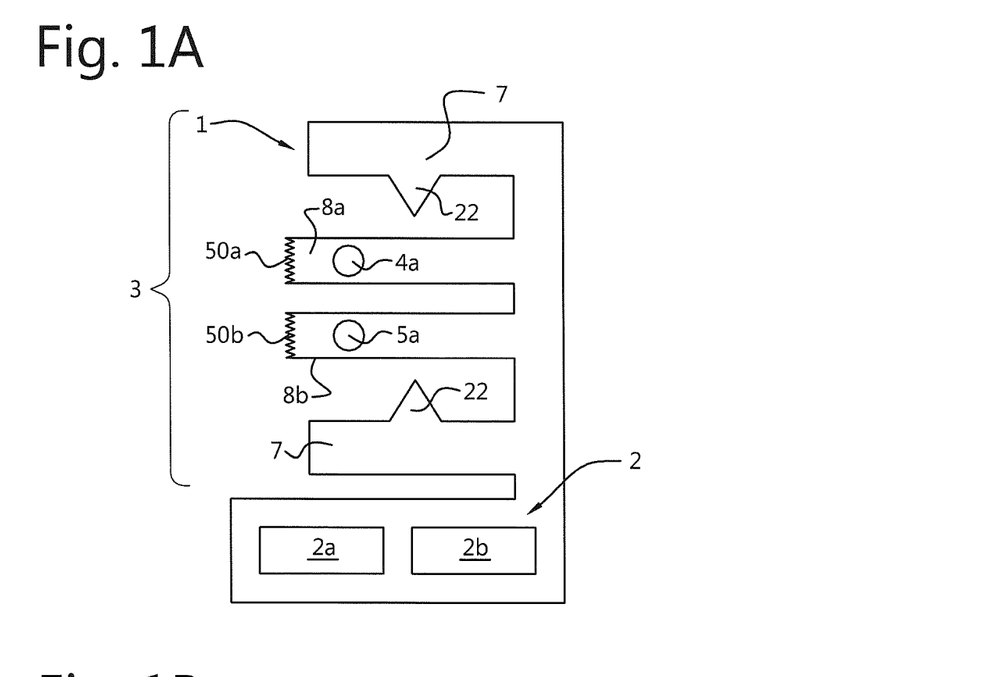
FIGS. 1a and 1b illustrate a side view along a longitudinal direction of embodiments of the overhead unit according to the present invention.
Figure 1B:
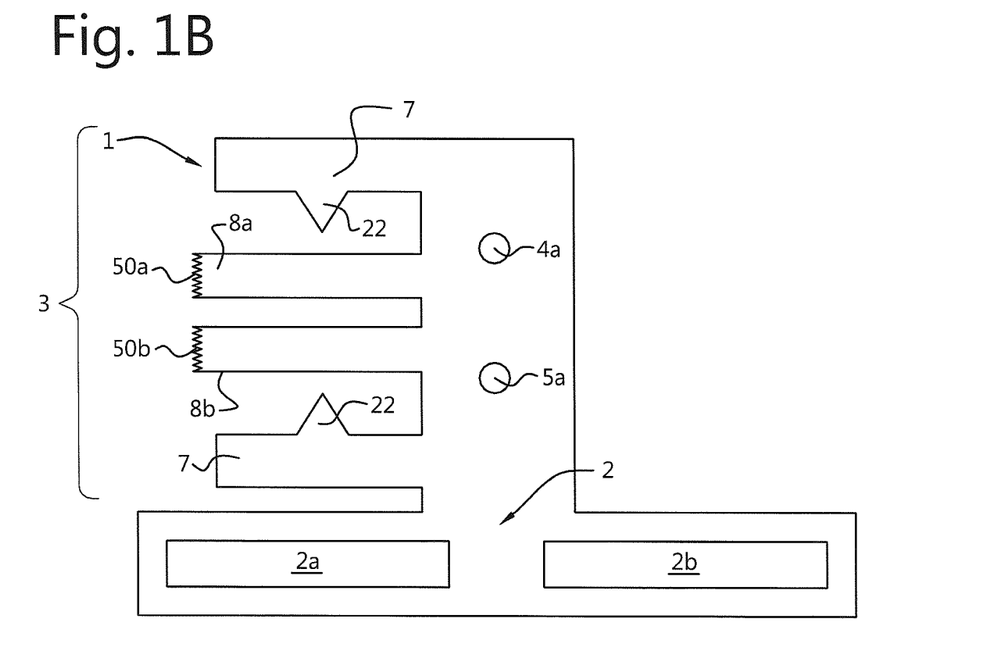
Figure 2:
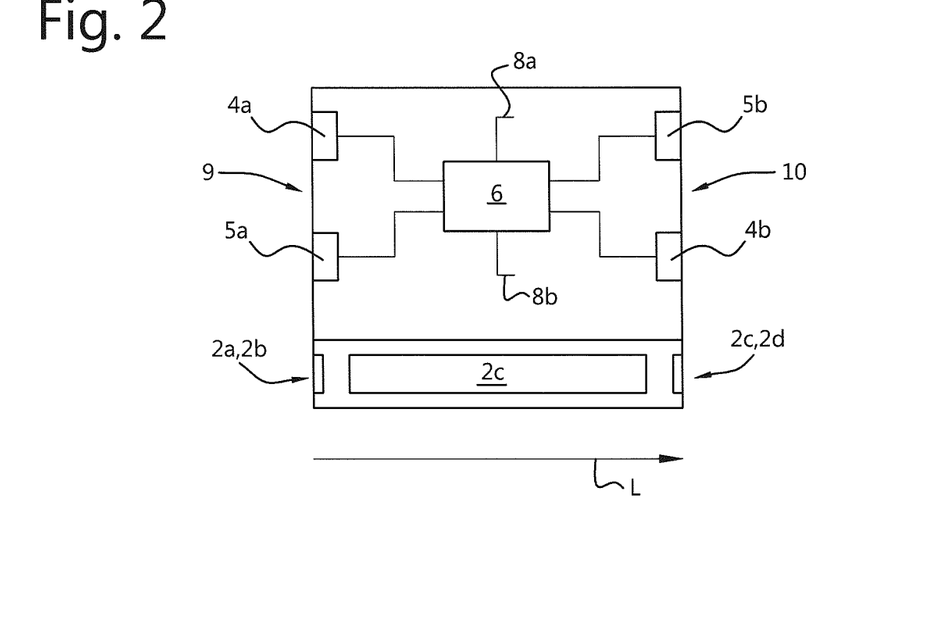
FIG. 2 illustrates an overhead unit according to the present invention and its receival modules, transmission modules and processing module.
Figure 6:
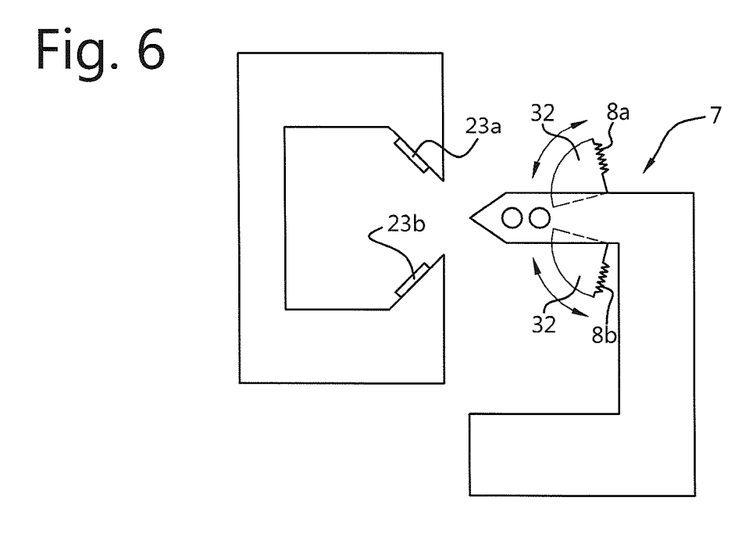
FIG. 6 illustrates an embodiment of the fixation module of the overhead unit and the rail according to the present invention.

The fixation module (3) is configured for removably attaching an overhead unit to the rail. Preferably the fixation module comprises a set of protrusions (22) as illustrated in FIGS. 1a and 1b, said protrusions configured for interlocking with a rail using a snap-fit fixation mechanism. Alternatively, or additionally, the overhead unit fixation module comprises a set of movable components (32) such as pins and/or clamps, which may preferably be mechanically, electromechanically, magnetically, electromagnetically or electrically actuated, said components being configured to releasably interlock with a rail according to the present invention, and preferably to releasably interlock with the rail at essentially every longitudinal position of the rail as illustrated in FIG. 6.

In a particularly preferred embodiment, said fixation module is configured for removably attaching an overhead unit to the rail in a slidable manner, i.e. whereby the overhead unit can be slid along the longitudinal direction of the rail. This may optionally be achieved by using a partially releasable fixation module which allows movement of the overhead unit along the longitudinal direction of a rail, but restricts or prohibits movements away from the rail.

Optionally, one or more screws are used to increase the static friction of the overhead unit on the rail once the overhead unit is slid towards the envisaged position on the rail.

In an embodiment, the receival module and the transmission module at the proximal end of the overhead unit are combined in a proximal transceiving module and/or the receival module and the transmission module at the distal end of the overhead unit are combined in a distal transceiving module. This allows a more compact arrangement of the overhead unit. In a preferred embodiment, the transceiving module comprises an antenna, e.g. a mm-wave antenna, which is configured for receiving and transmitting signals.

In an alternative embodiment, the receival modules and transmission modules are separated.

In an embodiment, the receival modules each comprise an electromagnetic-wave (EM-wave) sensor for receiving signals and the transmission modules each comprise an EM-wave source. Hereby, the EM-wave is non-penetrable with respect to the overhead unit, such that an overhead unit is only capable of receiving messages from and transmitting messages to its nearest neighbours when the overhead units are lined up. In that case, the overhead unit itself blocks the signals received from its nearest neighbours and prevents these signals to reach the overhead unit at the other side.

Preferably, said EM-wave of the sensor and source consists of:
- infrared (IR) light, preferably within a wavelength range of between 800 nm and 10000 nm;
- mm-waves;
- terahertz waves;
- visible light waves, or
- waves having a wavelength between 250 nm and 1 cm, more preferably lower than 3 mm.

Hereto, the source may comprise a LED, a laser or antenna, which is particularly suitable for transmitting the selected type of EM-wave, and the sensor may comprise a photovoltaic sensor or an antenna, also particularly suitable for receiving the selected type of EM-wave.

The processing module of the overhead unit is configured to receive signals via the receival modules from a neighbouring overhead unit or the control unit, and/or to cause the transmission modules to send out signals to a neighbouring overhead unit and/or the control unit. These signals preferably comprise instructions regarding:
- the message to be displayed on at least one and preferably each display screen;
- signals to be passed on to one or more overhead units, or to the control unit, further onwards, and/or
- position determining signals.

In a preferred embodiment, the transmission modules are configured to send out signals along the longitudinal direction. Hereby preferably the proximal transmission module is configured to send out signals along the longitudinal direction in a distal-to-proximal direction and/or the distal transmission module is configured to send out signals along the longitudinal direction in a proximal-to-distal direction. Similarly, the receival modules are preferably configured to receive signals along the longitudinal direction. Hereby preferably the proximal receival module is configured to receive signals along the longitudinal direction from a proximal side of the overhead unit and/or the distal receival module is configured to receive signals along the longitudinal direction from a distal side of the overhead unit. This directionality of transmission modules and/or receival modules allows signal transmission with lower power consumption and causing less interferences with other types of signals.

Preferably, the sensor of the proximal receival module is lined up along the longitudinal direction with the source of the distal transmission module; and the sensor of the distal receival module is lined up with the source of the proximal transmission module. In such a configuration, two essentially identical communication units of two overhead units which are lined up on the same rail, have compatible locations of sensors and sources. Indeed, a first, proximally placed overhead unit thus has a source of its distal transmission module lined up with and directed at a sensor of the proximal receival module of a second, distally placed overhead unit, and vice versa. The configuration hereby allows to form a daisy-chain configuration between a set of overhead units attached to the same rail, which will thus allow communication between on the one hand a control unit (30) comprising a transmission module (34a) and/or a receival module (35a) at a proximal and/or a distal end of the rail, and on the other hand all the overhead units attached to the rail.

In a preferred embodiment, the sensors of the receival modules and the sources of the transmission modules are located on or near the fixation module of the overhead such that if the overhead unit is attached to the rail, the line-of-sight of the sensors and sources is restricted by said rail, and preferably the line-of-sight of the sensors and sources is essentially determined by one or more longitudinal cavities (41, 42) of said rail. Restricting the line-of-sight of the sensors and sources may lead to better communication because interference with other sources of EM-waves is restricted, and diffraction effects or reflection effects on e.g. walls of the carriage in which the overhead units are located, are limited. For instance, if an EM-wave is used which comprises wavelengths of the order of the width of the overhead unit, diffraction may cause signals to reach overhead units which are not the nearest neighbours, i.e. the nearest neighbouring overhead unit may not completely block signals due to diffraction. Also, reflection from walls or interior elements in a carriage may be restricted or avoided. In an embodiment, the rail of the present invention comprises one or more longitudinal cavities (41, 42). In a preferred embodiment, the rail comprises a set of flaps or walls (43a, 43b, 43c, 43d) which at least partially define said cavities (41, 42). Note that said flaps or walls may also act as protective barrier against e.g. insertion of objects into the cavities which could lead to electrical short-circuiting or accidental insertion of fingers which could lead to electrocution. Preferably said cavities comprise a depth of at least 1 cm, more preferably at least 1.5 cm, still more preferably at least 2.0 cm, such as 3 cm, 4 cm, 5 cm, 6 cm, 7 cm, 8 cm or larger. In a possible embodiment, the longitudinal cavities (41,42) are protected by longitudinal covers which protect the longitudinal cavities from external influences and which can prohibit or decrease signal leakage and interference.

Alternatively, or additionally, the receival modules may be configured with a set of threshold levels arranged for ensuring that only direct signals from nearest-neighbouring overhead units are being processed and/or the transmission modules may be configured for ensuring that a signal reaches a sensor of a neighbouring overhead unit with a pre-defined threshold level.

In an embodiment, the overhead unit, and preferably the fixation module of the overhead unit, comprises a bus connection module for connecting the overhead unit to a bus connection of the rail of the present invention. Likewise, the rail of the present invention preferably comprises a set of bus connections (40a, 40b), preferably arranged along the length of the rail. The use of a bus connection module for the overhead unit and bus connection for the rail is particularly preferred if the overhead unit is used to present, to gather and/or to transfer a large amount of information. Note that small chunks of information could also be communicated using the receiving and transmission modules of the overhead units.

In a preferred embodiment, the bus connection module of the overhead unit comprises a set of electrical contacts (50a, 50b) which may optionally comprise an actuator configured to ensure contact with a corresponding bus connection (40a, 40b) of the rail of the present invention. This actuator may be mechanical, electromechanical, magnetic, electromagnetic or electric. For instance, the actuator may be spring loaded, e.g. whereby the electrical contacts comprise one or more pogo-pins arranged to ensure contact with the bus connection of the rail.

In an embodiment of the present invention, the bus connection module of the overhead unit and the bus connection of the rail is configured in accordance with one of the following standards: RS485, I²C, Controller Area Network (CAN), CAN with Flexible Data-Rate (CAN FD).

Preferably the CAN or the CAN FD standard is used, as these allow correct communication over long distances of up to and more than 40 m, and thus allow a bus connection to be used over a rail spanning over the length of long carriages.

The use of a bus connection has a number of advantages:
redundancy of communication channels: communication between overhead units among each other and/or with a control unit can be performed via the receival and transmission modules and via the bus connection, thereby having both a wireless and a wired communication channel;
diagnostics of the communication channels can be more easily performed;
data requiring a large bandwidth may be communicated to and from the overhead units, which is not always easy if only the wireless communication channel using the receival and transmission modules of the overhead units is used, in particular if they are used in a daisy-chain type of communication.

In an embodiment, the bus connection module is connected with the processing module, which is configured to receive and/or send signals via the bus connection modules.

In an embodiment, the overhead unit comprises an additional processing module connected to the bus connection module and arranged to allow communication between the overhead unit and the control unit or other overhead units via said bus connection. Hereby, said additional processing module may be connected to the function module of the overhead unit, e.g. to provide the function module with data or instructions, and/or to receive data or instructions from the function module which are to be sent over the bus connection.

Figure 3A:
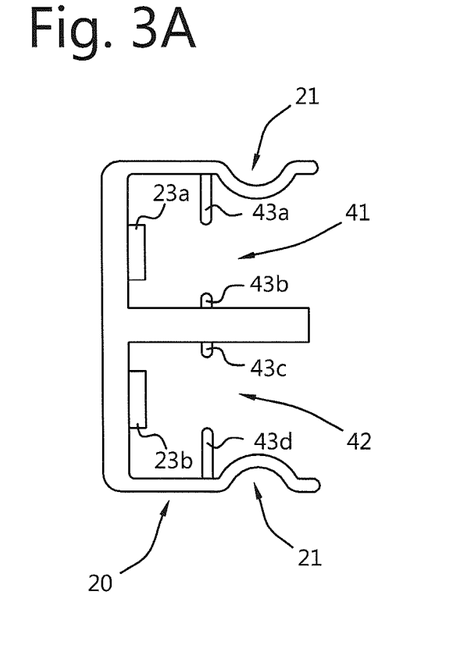
FIGS. 3a and 3b illustrate a cross-sectional view along the longitudinal direction of embodiments of the rail according to the present invention.
Figure 3B:
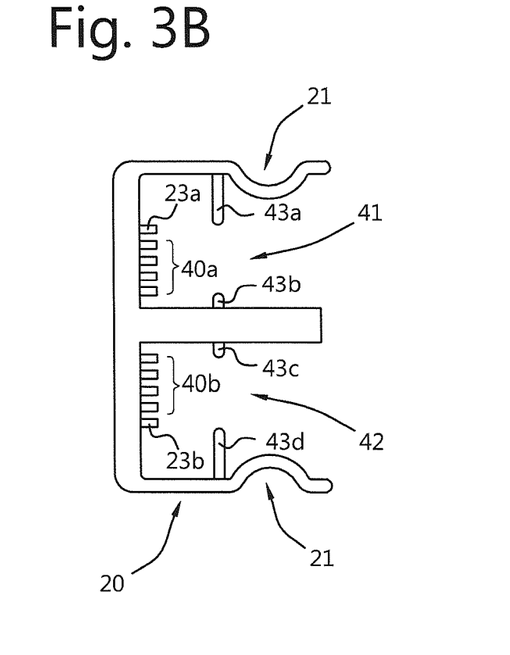
Figure 4:
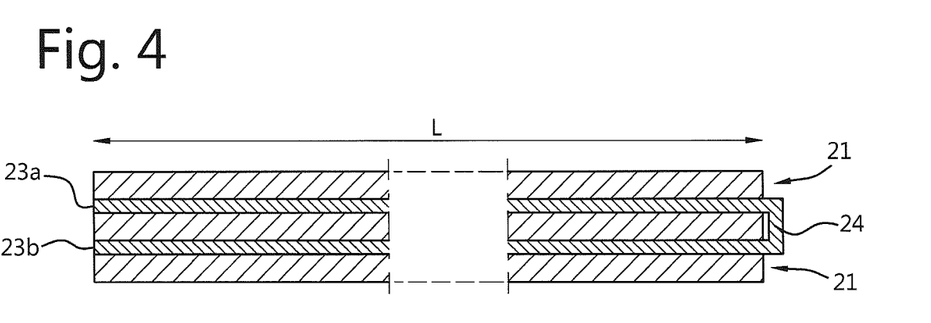
FIG. 4 illustrates a side view of an embodiment of the rail according to the present invention along a direction transversal to the longitudinal direction.
Figure 5:
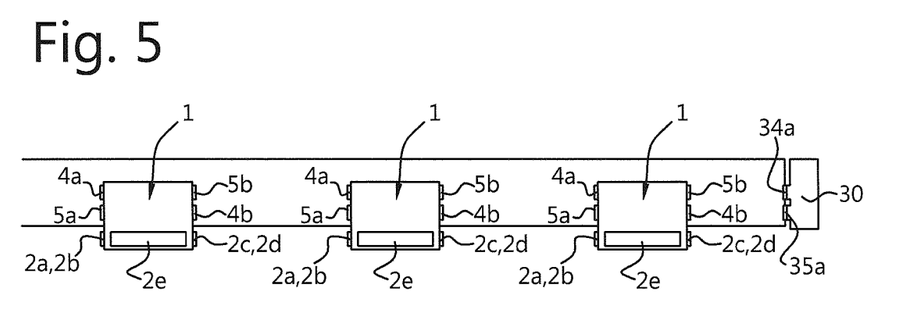
FIG. 5 illustrates a system according to the present invention along a direction transversal to the longitudinal direction.

The rail (20) according to the present invention comprises an overhead unit fixation module (21) configured for removably attaching an overhead unit to the rail. Preferably the overhead unit fixation module comprises a snap-fit fixation mechanism which is arranged to releasably interlock with a set of protrusions (22) of the fixation module of the overhead unit as illustrated in FIGS. 3a and 3b. Alternatively, or additionally, the overhead unit fixation module may comprise a set of movable components (32) such as pins and/or clamps, which may preferably be mechanically, electromechanically, magnetically, electromagnetically or electrically actuated, said components being configured to releasably interlock with the rail according to the present invention, and preferably to releasably interlock with the rail at essentially every longitudinal position of the rail as illustrated in FIG. 6.

The rail preferably comprises electrical power provision means, preferably comprising electrical power contacts (23a, 23b), for providing an overhead unit attached to the rail with electrical power. These electrical power provision means are preferably arranged along a longitudinal direction of the rail, such that overhead units can be connected at essentially every position along the rail. The electrical power provision means can be provided with an electrical current and/or voltage (24) at a distal and/or proximal end of the rail.

Figure 7A:
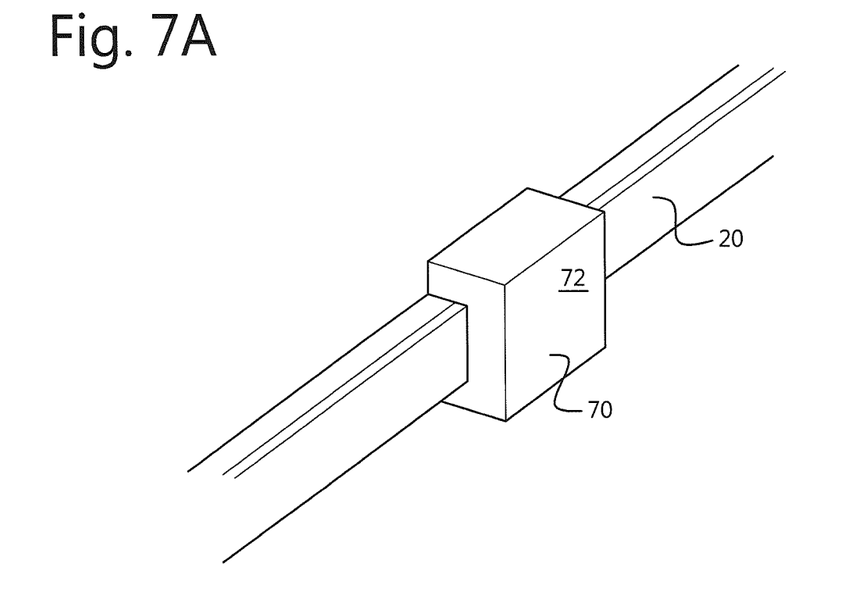
FIG. 7a illustrates a perspective view of a rail with a rail covering unit and an overhead unit according to the present invention.
Figure 7B:
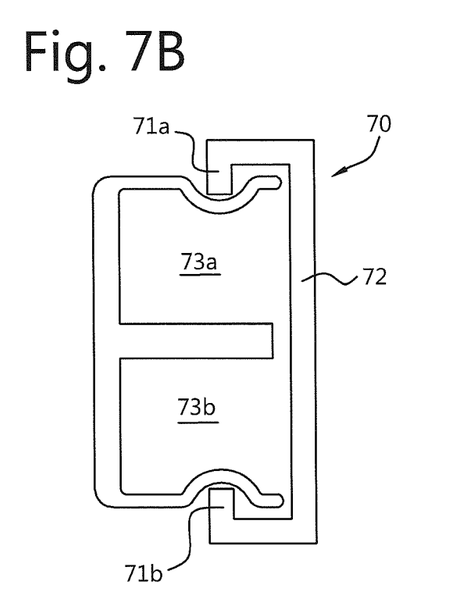
FIG. 7b illustrates a cross-sectional view of a rail and a rail covering unit according to the present invention.

The present invention also concerns a rail covering unit. An exemplary embodiment of such a rail covering unit is illustrated in FIGS. 7a and 7b. The rail covering unit (70) comprises a fixation module for removably attaching the rail covering unit to a rail (20), wherein the fixation module comprises a mechanical fixation system (71a, 71b) configured to interlock with a fixation system of the rail. Preferably the mechanical fixation system is configured to interlock with the fixation system of the rail with a snap-fit connection. The rail covering unit also comprises a cover (72) which can be configured to at least partially cover one or more cavities (73a, 73b) of the rail, preferably at least the one or more longitudinal cavities of the rail. The rail covering unit can be placed on the rail where no overhead units are placed, thereby protecting cavities of the rail from accidental or deliberate manipulation by an unauthorized person and prevent signal leakage and interference.

In an embodiment of the present invention, the overhead unit comprises a side portion along the longitudinal direction which extends from the proximal end of the overhead unit to the distal end of the overhead unit, and which is configured to hide the receival modules and/or the transmission modules from users if the overhead unit is attached to a rail according to invention. In a preferred embodiment, the side portion partially comprises the function module, e.g. a display screen may be located on the outer side of the side portion.

In a preferred embodiment, the transmission source of the distal transmission module is located longitudinally recessed with respect to the distal end of the side portion and/or the transmission source of the proximal transmission module is located longitudinally recessed with respect to the proximal end of the side portion. Alternatively or additionally, the sensor of the distal receival module is located longitudinally recessed with respect to the distal end of the side portion and/or the sensor of the proximal receival module is located longitudinally recessed with respect to the proximal end of the side portion. This allows to arrange a set of overhead units, and optionally rail covering units, along a rail, in a contiguous manner, thus covering any cavities of the rail and/or those parts of the units which one does not want to be exposed to unauthorized persons or outside influences. Basically, the side portion can serve as a cover for the electronics and/or the fixation module of the overhead unit.

Figure 8:
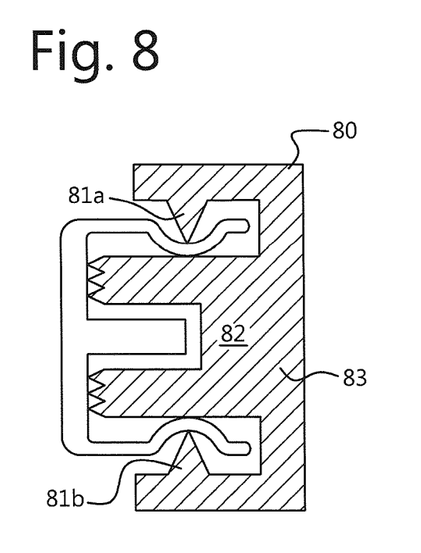
FIG. 8 shows a cross-sectional view of an overhead unit attached to a rail, in accordance with the present invention.
Figure 9:
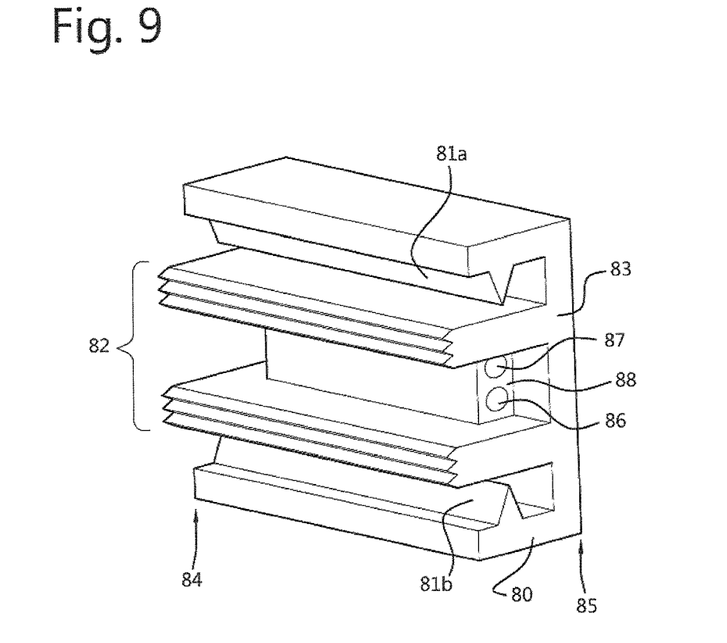
FIGS. 9 and 10 show a perspective view of an overhead unit which has a cross section as shown in FIG. 8.
Figure 10:
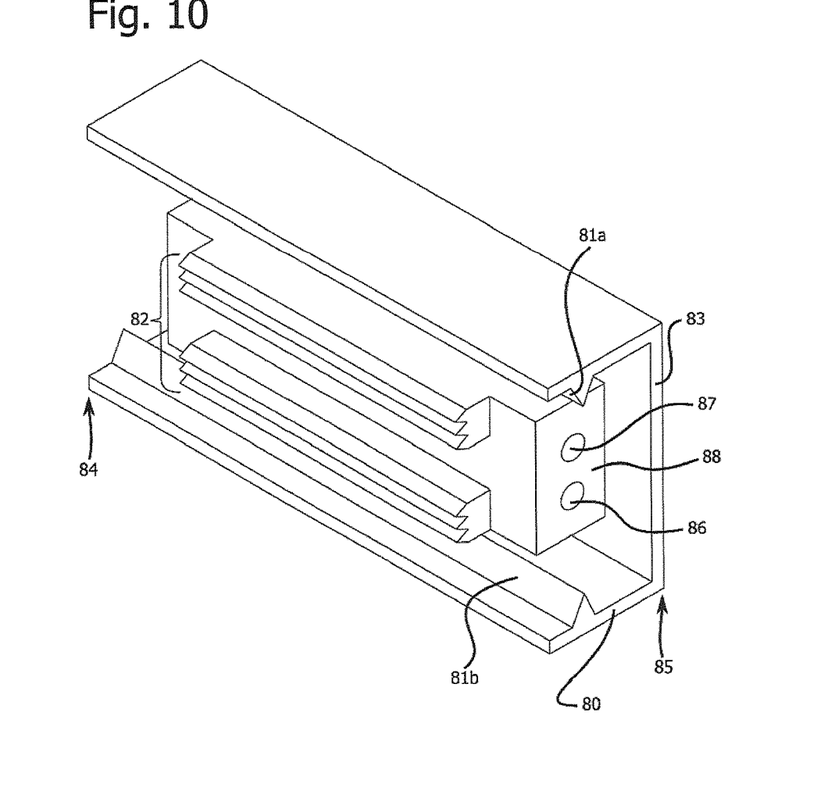

An exemplary embodiment of an overhead unit with a side portion as described above is illustrated in FIGS. 8, 9 and 10. FIG. 8 illustrates a cross-sectional view of an overhead unit (80), and shows the fixation module with a fixation mechanism (81a, 81b), a central region (82) and a side portion (83). FIG. 9 shows a perspective view of the overhead unit (80), and shows the fixation module with a fixation mechanism (81a, 81b), a central region (82) and a side portion (83) stretching from the proximal end (84) to the distal end (85). FIG. 10 also shows a perspective view of a slightly different overhead unit (80), and shows the fixation module with a fixation mechanism (81a, 81b), a central region (82) and a side portion (83) stretching from the proximal end (84) to the distal end (85). The sensor (86) of the distal receival module and the transmission source (87) of the distal transmission module are located on a longitudinally recessed portion (88) with respect the distal end (85) of the side portion. Hence, one can see that when the overhead units of FIGS. 9 and 10 are attached to a rail as illustrated in FIG. 8, the side portions (83) of different overhead units can be made to form a contiguous side hiding the transmission and receival modules within the confines of the rail and the side portions of the overhead units. The difference between the embodiments of FIG. 9 and FIG. 10, is that the electrical contacts in the central region (82) in FIG. 10 are also shorter than the length of the side portion (83), and are thus better hidden from external influences.

The control unit comprises a transmission module and a receival module for communicating with at least one overhead unit. The control unit is preferably configured to be attached to a longitudinal end of the rail of the present invention. In the following, we will refer to the longitudinal end where the control unit is located as the proximal end. The control unit is preferably configured to:

a) send a position determining signal via the transmission module to a sensor of a receival module of a first overhead unit longitudinally lined up with the control unit in the distal direction, preferably along the rail according to the present invention, said position determining signal comprising instructions for the first overhead unit to:

a1) optionally send a response back to the proximal direction, preferably immediately, and preferably a response comprising a timestamp indicative of the time-of-receipt of the signal. This response can be transmitted via the source of the proximal transmission module of the first overhead unit, said response preferably comprising an identification number;

a2) send a position determining signal through in the distal direction to a neighbouring distally located overhead unit lined up with the first overhead unit, said position determining signal comprising instructions a1 and a2;

b) receive a response to the position determining signal from the first overhead unit, c) optionally receive responses from overhead units located distally further than the first overhead unit using a daisy-chain type communication method, d) determine the number of overhead units and the positions of the overhead units located along the longitudinal direction taking into account the received responses.

In an embodiment, the response received in step b is a response send back by the neighbouring overhead unit in accordance with step a1 executed by said neighbouring unit. Alternatively, or additionally, the response received in step b is a reflection of the position determining signal sent in step a by said first overhead unit.

In a preferred embodiment, the kit and/or system of the present invention comprises an additional control unit, which preferably is or can be attached to the distal end of the rail. This additional control unit is preferably operationally connected to the control unit at the proximal end, and can preferably be configured to:

act as a back-up of the control unit at the proximal end;
duplicate the actions of the control unit at the proximal end, e.g. for redundancy or for diagnostics, and/or
ensure good communication with overhead units located near the distal end of the rail.

Individual or grouped overhead units on carriages can be used to present information via a displaying module, for instance:

reservation of a (set of) seat(s), which may include a reservation number or reservation ID;
occupancy status of a (set of) seat(s);
warnings or other indications, e.g. to a seat occupant to notify that destination will be reached soon;
other information can also be displayed, such as general travel information.

Information can also be presented auditory, e.g. via an intercom module provided on the overhead unit.

Hence, in a preferred embodiment, the function module of the overhead unit comprises a displaying module, preferably comprising a set of at least one display screen. Likewise, in a preferred embodiment, the control unit is configured to send a signal to the first overhead unit, the signal comprising:

data representing the overhead unit for which the signal is intended;
data representing a message to be displayed on a display screen of said displaying unit.

In a preferred embodiment, the overhead unit comprises a displaying module with a display screen oriented essentially parallel to the longitudinal direction and preferably also parallel to a vertical direction or to a horizontal direction. More preferably, the display screen stretches from the distal end to the proximal end, i.e. along the full length of the overhead unit in the longitudinal direction. In an embodiment, the kit and/or system of the present invention comprises a set of at least one, but preferably two or more of such overhead units. These overhead units can preferably be arranged such that the display screens of the overhead units are arranged contiguously, thereby seemingly forming an extended display screen consisting of many different display screens from different overhead units. Since the overhead units can be used to present individualized messages, the display screen of each of the overhead units can be configured to show a part of a larger message. In this setup, a larger message can be shown on the extended display screen formed by the separate contiguously arranged display screens. This can be used to show films or moving light strip messages.

Alternatively or additionally, overhead units on carriages can be used to gather information, for instance:

the function module of the overhead unit may comprise a seat occupation sensor to sense if a seat is actually occupied;
the function module of the overhead unit may comprise a CCTV camera for obtaining security footage;
microphone/auditory sensors;
Volatile organic compounds (VOC) sensors;
emergency lighting;
the function module of the overhead unit may comprise a smoke detector sensor or any other type of security sensor, and/or
the function module of the overhead unit may comprise an alarm button.

Another possible function of overhead units in carriages is to act as an information transfer node, e.g. a hotspot, router or access point for wireless communication. Thereto, the function module of the overhead may comprise:

a WiFi access point module and/or a WiFi signal enhancement module;
a LiFi access point module and/or a LiFi signal enhancement module;
a Bluetooth module;
an ethernet interface with ethernet plug, and/or
a USB interface with a USB port.

Still other functions may be possible for these overhead units, such as:

lighting. Hereto, the overhead unit can be provided with a light which can be switched on or off by a passenger using a switch. Additionally or alternatively the overhead unit can be provided with a smart lighting module, which is configured to regulate the light levels and/or light colours depending on a number of factors such as seat occupancy, environmental light level, time of day, location of the carriage, function of the carriage or carriage zone (such as quiet zone, business zone, breast-feeding zone) etc. For these factors, the overhead unit may be provided with a number of dedicated sensors and/or may be in communication with a central control server unit;
power provision. Hereto, the overhead can be provided with a power plug, or with a USB port.

The system as described in this document allows to perform a method for configuring and/or reconfiguring an overhead system for presenting individualized messages, comprising the steps of:
  providing a carriage having a specific interior arrangement;
  attaching a set of overhead units lined up along a longitudinal direction, each overhead unit being attached along said longitudinal direction at a position compatible with the interior arrangement;
  determining the positions of each overhead unit of the set using a control unit according to the present invention, by performing the steps a-d described here above.

The invention claimed is:

1. An overhead unit (1) for presenting information, gathering information, transferring information, lighting and/or alarm signals in an individualized manner in a carriage or fuselage, the overhead unit comprising:
  a function module (2),
  a fixation module (3) for removably attaching the overhead unit to a rail,
  two receival modules (5a, 5b) for receiving signals,
  two transmission modules (4a, 4b) for sending messages, and
  a processing module (6) for processing messages,
  wherein the two receival modules and the two transmission modules are operationally connected to the processing module, p1 wherein the fixation module comprises a mechanical fixation system (7) configured to interlock with a fixation system of the rail,
  wherein the overhead unit comprises a proximal longitudinal end (9) and a distal longitudinal end (10) which define a longitudinal direction (L) which is configured to essentially coincide with the longitudinal direction of the rail when the overhead unit is attached to the rail,
  wherein the two receival modules comprise a proximal receival module located at the proximal end of the overhead unit and a distal receival module located at the distal end of the overhead unit, wherein each of the two receival modules comprises a respective sensor,
  wherein the two transmission modules comprise a proximal transmission module located at the proximal end of the overhead unit and a distal transmission module located at the distal end of the overhead unit, wherein each of the two transmission modules comprises a respective transmission source,
  wherein the processing module of the overhead unit is configured to receive signals via the two receival modules from a neighbouring overhead unit or from a neighbouring control unit, and/or wherein the processing module of the overhead unit is configured to cause the two transmission modules to send out signals to a neighbouring overhead unit and/or the control unit, and
  wherein each of the two receival modules further comprises a respective electromagnetic-wave (EM-wave) sensor for receiving signals and each of the two transmission modules further comprises a respective EM-wave source, wherein an EM-wave produced by either of the two transmission modules is non-penetrable with respect to the overhead unit.

2. The overhead unit according to claim 1, wherein each of the two receival modules further comprises a respective infrared (IR) sensor for receiving IR signals and wherein the two transmission modules comprise an infrared light source for transmitting IR signals.

3. The overhead unit according to claim 1, wherein the function module comprises at least one of:
  a displaying module comprising a set of display screens for presenting individualized information to a passenger;
  an intercom module;
  a data-gathering module for obtaining data at or near the location of the overhead unit;
  a lighting module;
  an information transfer module;
  a power provision module.

4. The overhead unit according to claim 1, wherein the fixation module comprises a set of electrical power contacts (8a, 8b) which are configured to make contact with electrical power leads of a rail when the fixation module of the overhead unit is interlocked with the fixation system of said rail, and/or wherein the overhead unit comprises a battery for providing power to electrical components of the overhead unit.

5. The overhead unit according to claim 1, wherein the sensor of the proximal receival module is lined up along the longitudinal direction with the source of the distal transmission module and the sensor of the distal receival module is lined up with the source of the proximal transmission module.

6. The overhead unit according to claim 1, comprising a bus connection module.

7. A kit comprising:
  the overhead unit according to claim 1, and
  the rail, wherein the rail comprises:
    an overhead unit fixation module configured to removably attach the overhead unit to the rail via a snap-fit fixation mechanism which is arranged to interlock with a set of protrusions of the fixation module,
    electrical power provision means configured to provide electrical power to the overhead unit when the overhead unit is attached to the rail, the electrical power provision means being arranged along a longitudinal direction of the rail, thereby permitting the overhead unit to be connected at essentially any position along the rail, and
    one or more longitudinal cavities adapted for restricting a line-of-sight of a plurality of sensors and sources of the overhead unit when the overhead unit is attached to the rail.

8. A system for presenting individualized information to passengers in a carriage or fuselage, comprising:
  the overhead unit according to claim 1;
  the rail, wherein the rail comprises:
    an overhead unit fixation module, wherein the overhead unit is removably attached to said rail via a snap-fit fixation mechanism of the rail which is arranged to interlock with a set of protrusions of the fixation module,
    electrical power provision means configured to provide electrical power to the overhead unit when the overhead unit is attached to the rail, the electrical power provision means being arranged along a longitudinal direction of the rail, thereby permitting the overhead unit to be connected at essentially any position along the rail, and
    one or more longitudinal cavities adapted for restricting a line-of-sight of a plurality of sensors and sources of the overhead unit when the overhead unit is attached to the rail; and
  a control unit attached to a longitudinal end of said rail.

9. A carriage or fuselage comprising a system according to claim 8.

10. The overhead unit according to claim 1, further comprising a side portion along the longitudinal direction which extends from the proximal longitudinal end of the overhead unit to the distal longitudinal end of the overhead unit, and which is configured to hide the two receival modules and/or the two transmission modules from users when the overhead unit is attached to the rail.

11. The overhead unit according to claim 10, wherein the transmission source of the distal transmission module is located longitudinally recessed with respect to a distal end of the side portion and/or the transmission source of the proximal transmission module is located longitudinally recessed with respect to a proximal end of the side portion.

12. The overhead unit according to claim 10, wherein the sensor of the distal receival module is located longitudinally recessed with respect to a distal end of the side portion and/or the sensor of the proximal receival module is located longitudinally recessed with respect to a proximal end of the side portion.

13. The overhead unit according to claim 3, wherein:
the data-gathering module comprises a seat occupancy sensor, a camera, microphone/auditory sensors, a VOC sensor, a smoke detector sensor, a security sensor, and/or an alarm button;
the lighting module is configured to control user-operated lighting, emergency lighting, and/or cabin lighting;
the information transfer module comprises a WiFi access point module, a WiFi signal enhancement module, a LiFi access point module, a LiFi signal enhancement module, a Bluetooth module, an Ethernet interface with an ethernet plug, and/or a USB interface with a USB port; and/or
the power provision module comprises an electrical plug and/or a USB port.

14. A rail comprising:
an overhead unit fixation module (21) configured to removably attach an overhead unit to the rail with a mechanical fixation system (7) of a fixation module of the overhead unit, wherein the overhead unit fixation module comprises a snap-fit fixation mechanism which is arranged to interlock with a set of protrusions (22) of the fixation module of the overhead unit,
electrical power provision means configured to provide electrical power to the overhead unit when the overhead unit is attached to the rail, the electrical power provision means being arranged along a longitudinal direction of the rail, thereby permitting the overhead unit to be connected at essentially any position along the rail; and
one or more longitudinal cavities (41, 42) adapted for restricting a line-of-sight of a plurality of sensors and sources of the overhead unit when the overhead unit is attached to the rail.

15. A rail covering unit for covering the rail recited in claim 14, wherein the rail covering unit comprises a rail covering unit fixation module for removably attaching the rail covering unit to the rail, wherein the rail covering unit fixation module comprises a mechanical fixation system configured to interlock with the overhead unit fixation module, the rail covering unit also comprising a cover configured to at least partially cover the one or more longitudinal cavities of the rail.

16. A control unit comprising a transmission module and a first receival module for communicating with at least one overhead unit, the control unit being configured to:
a) send a position determining signal via the transmission module to a sensor of a second receival module of a first overhead unit longitudinally lined up with the control unit in a distal direction, said position determining signal comprising instructions for the first overhead unit to:
a1) send a response back to a proximal direction via a source of the proximal transmission module of the first overhead unit, wherein said response comprises an identification number;
a2) send the position determining signal through in the distal direction to a neighbouring distally located overhead unit lined up with the first overhead unit;
b) receive at least one response to the position determining signal, the at least one response including a response from the first overhead unit,
c) determine a number of overhead units and respective positions of the determined number of overhead units located along the longitudinal direction taking into account the at least one received response.

17. The control unit according to claim 16, wherein the control unit is further configured to be attached to a longitudinal end of a rail comprising an overhead unit fixation module configured for removably attaching the at least one overhead unit.

18. The control unit according to claim 16, wherein the control unit is further configured to send a signal to the first overhead unit, the signal comprising:
data representing an identity of an particular overhead unit for which the signal is intended, and/or
data representing a message to be displayed on a display screen of a display module of the particular overhead unit.

* * * * *

UNITED STATES PATENT AND TRADEMARK OFFICE
CERTIFICATE OF CORRECTION

PATENT NO. : 12,062,892 B2
APPLICATION NO. : 17/753674
DATED : August 13, 2024
INVENTOR(S) : Steven Lauwereins, Dirk Van Den Wouwer and Geert Van Doorselaer It is certified that error appears in the above-identified patent and that said Letters Patent is hereby corrected as shown below:

In the Claims

Column 13, Line 28, Claim 1, the text 'p1' should be replaced with --,--

Column 13, Line 28, Claim 1, a line break should be inserted before the text 'wherein the fixation module com-'

Signed and Sealed this
Seventeenth Day of September, 2024

Katherine Kelly Vidal
*Director of the United States Patent and Trademark Office*